United States Patent
Nordstrom et al.

(10) Patent No.: US 9,584,705 B2
(45) Date of Patent: Feb. 28, 2017

(54) WEARABLE CAMERA SYSTEMS

(71) Applicant: Google Inc., Mountain View, CA (US)

(72) Inventors: Paul G. Nordstrom, Seattle, WA (US); Udi Manber, Los Altos, CA (US); Matthew Amacker, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/894,527

(22) Filed: May 15, 2013

(65) Prior Publication Data

US 2015/0172538 A1    Jun. 18, 2015

Related U.S. Application Data

(60) Provisional application No. 61/781,506, filed on Mar. 14, 2013.

(51) Int. Cl.
| | |
|---|---|
| *H04N 5/225* | (2006.01) |
| *H04N 5/232* | (2006.01) |
| *H04N 7/18* | (2006.01) |

(52) U.S. Cl.
CPC ....... *H04N 5/2252* (2013.01); *H04N 5/23206* (2013.01); *H04N 7/185* (2013.01)

(58) Field of Classification Search
CPC .......................... H04N 2101/00; H04N 5/2252
USPC ....................................................... 348/207.1
See application file for complete search history.

(56) References Cited

U.S. PATENT DOCUMENTS

| | | | | |
|---|---|---|---|---|
| 4,298,913 A | * | 11/1981 | Lozar ................. | A42B 3/044 362/103 |
| 5,815,126 A | * | 9/1998 | Fan et al. .................... | 345/8 |
| 6,056,413 A | * | 5/2000 | Urso ................. | F21V 21/30 362/106 |
| 6,206,543 B1 | * | 3/2001 | Henry .................... | 362/191 |
| 6,317,039 B1 | * | 11/2001 | Thomason .................... | 340/505 |
| 6,467,929 B2 | * | 10/2002 | Lee .................... | 362/191 |
| 6,604,837 B2 | * | 8/2003 | Sandberg ................. | 362/191 |
| 6,704,044 B1 | * | 3/2004 | Foster et al. .................. | 348/157 |
| 6,717,737 B1 | * | 4/2004 | Haglund ............. | G02B 27/017 345/7 |
| 6,733,150 B1 | * | 5/2004 | Hanley ................. | 362/106 |

(Continued)

FOREIGN PATENT DOCUMENTS

GB          2251780 A  *  7/1992  ............. G03B 29/00

OTHER PUBLICATIONS

Kim T; KR Patent Application Pub 2010-072793; "Golf hat, has awning part adhered to front end of band part that is inserted in circumference of cover, display panel displaying image photographed with camera, and mounting unit mounted on side of cover"; Jul. 2010; abstract.*

(Continued)

*Primary Examiner* — Roberto Velez
*Assistant Examiner* — Cynthia Segura
(74) *Attorney, Agent, or Firm* — Fish & Richardson P.C.

(57) ABSTRACT

Methods, systems, and apparatus, including computer programs encoded on a computer storage medium, for wearable camera systems. In one aspect, a hat and a camera system for the hat can be used for an interactive session with a remote user. In another aspect, the hat and camera system for the hat can be used to interact with an emergency situation routing system.

17 Claims, 5 Drawing Sheets

(56) References Cited

U.S. PATENT DOCUMENTS

| | | | | |
|---|---|---|---|---|
| 6,819,354 B1* | 11/2004 | Foster | H04N 7/183 | 348/157 |
| 7,163,309 B2* | 1/2007 | Sohn | | 362/106 |
| 8,063,934 B2* | 11/2011 | Donato | A42B 3/042 | 345/8 |
| 8,077,029 B1* | 12/2011 | Daniel | G08B 13/19621 | 340/531 |
| 8,461,983 B2* | 6/2013 | McCauley | G08B 25/001 | 340/539.1 |
| 8,519,834 B2* | 8/2013 | Jersa | H04M 19/047 | 340/4.12 |
| 8,970,689 B2* | 3/2015 | Campbell et al. | | 348/81 |
| 2003/0053608 A1* | 3/2003 | Ohmae et al. | | 379/93.25 |
| 2003/0122958 A1* | 7/2003 | Olita | A42B 3/042 | 348/373 |
| 2003/0206099 A1* | 11/2003 | Richman | | 340/506 |
| 2004/0008157 A1* | 1/2004 | Brubaker et al. | | 345/8 |
| 2004/0013279 A1* | 1/2004 | Takeda | | 381/312 |
| 2005/0201584 A1* | 9/2005 | Smith | H04R 23/00 | 381/376 |
| 2005/0225443 A1* | 10/2005 | Lerg | G08B 21/0202 | 340/539.13 |
| 2006/0048286 A1* | 3/2006 | Donato | A42B 3/042 | 2/422 |
| 2006/0121950 A1* | 6/2006 | Lee | H04M 1/05 | 455/569.1 |
| 2006/0215393 A1* | 9/2006 | VanderSchuit | G09F 21/02 | 362/106 |
| 2007/0109768 A1* | 5/2007 | Sohn | F21S 9/037 | 362/106 |
| 2007/0159810 A1* | 7/2007 | Kim | A42B 3/044 | 362/105 |
| 2008/0001735 A1* | 1/2008 | Tran | | 340/539.22 |
| 2008/0107414 A1* | 5/2008 | Showalter | | 396/429 |
| 2008/0137589 A1* | 6/2008 | Barrett | H04M 3/42348 | 370/327 |
| 2009/0038056 A1* | 2/2009 | Bobbin | A42B 3/044 | 2/422 |
| 2009/0109292 A1* | 4/2009 | Ennis | A42B 3/042 | 348/158 |
| 2009/0174547 A1* | 7/2009 | Greene | A62B 99/00 | 340/539.13 |
| 2009/0271243 A1* | 10/2009 | Sholl | G06Q 30/018 | 434/365 |
| 2009/0322512 A1* | 12/2009 | Frederick | G08B 3/10 | 340/539.11 |
| 2010/0214767 A1* | 8/2010 | Waters | A42B 1/244 | 362/106 |
| 2010/0287685 A1* | 11/2010 | Peterson et al. | | 2/209.13 |
| 2010/0313335 A1* | 12/2010 | Waters | | 2/209.13 |
| 2011/0261176 A1* | 10/2011 | Monaghan, Sr. | G02B 27/017 | 348/61 |
| 2012/0050607 A1* | 3/2012 | Sims et al. | | 348/373 |
| 2012/0066351 A1* | 3/2012 | Choi | H04L 65/80 | 709/219 |
| 2012/0077437 A1* | 3/2012 | Agevik | G01C 21/20 | 455/41.2 |
| 2013/0033610 A1* | 2/2013 | Osborn | | 348/207.1 |
| 2013/0047317 A1* | 2/2013 | Hanover | A42B 1/24 | 2/209.12 |
| 2013/0127980 A1* | 5/2013 | Haddick et al. | | 348/14.08 |
| 2013/0163090 A1* | 6/2013 | Yu | G06F 3/011 | 359/630 |
| 2013/0174205 A1* | 7/2013 | Jacobsen | H04N 21/43637 | 725/81 |
| 2013/0201299 A1* | 8/2013 | Waters | A42B 1/244 | 348/49 |
| 2014/0049636 A1* | 2/2014 | O'Donnell | G08C 17/02 | 348/143 |
| 2014/0053318 A1* | 2/2014 | Fitzgerald et al. | | 2/209.13 |
| 2014/0270685 A1* | 9/2014 | Letke | A42B 1/244 | 386/224 |
| 2014/0304891 A1* | 10/2014 | Waters | A42B 1/24 | 2/209.13 |
| 2014/0352033 A1* | 12/2014 | Bryan et al. | | 2/244 |
| 2014/0361881 A1* | 12/2014 | Reilly | G08B 6/00 | 340/407.1 |
| 2015/0009309 A1* | 1/2015 | Heinrich | G02B 27/017 | 348/61 |
| 2015/0036003 A1* | 2/2015 | Sakurai | H04N 5/772 | 348/207.11 |

OTHER PUBLICATIONS

Mobius Action-Cam; Aug. 2013; http://mobius-actioncam.com.*
Mobius Action-Cam; Apr. 2014; http://mobius-actioncam.com.*
2C Light Company, "2C Soloar Light Cap," retrieved on Nov. 8, 2012 from <http://www.solarlightcap.com/html/green_technology.html>, 2 pages.
Looxcie, Inc., "Looxcie 2—User Manual for Android—Model: LX2," retrieved on Nov. 8, 2012 from < www.looxcie.com>, 37 pages.
Rhino Outdoors, LLC, "LidCam—User Manual," retrieved on Jan. 9, 2012 from <www.rhinooutdoors.com>, 2 pages.
Woodman Labs, Inc., "HERO3: Black Edition," retrieved on Nov. 8, 2012 from <http://gopro.com/cameras/hd-hero3-black-edition>, 22 pages.
Woodman Labs, Inc., "Wi-Fi BacPac + Wi-Fi Remote Combo Kit," retrieved on Nov. 8, 2012 from <http://gopro.com/hd-hero-accessories/wi-fi-bacpac-remote-combo/>, 16 pages.
Brando Workshop, "Diving Spy Mini Camera with Laser Indicator and Remote Control," retrieved on Nov. 8, 2012 from <http://gadget.brando.com/diving-spy-mini-camera-with-laser-indicator-and-remote-control_p01706c0>, 7 pages.
AgileMesh, Inc., "BODYView Series—Wearable—Live, First-Person-View Surveillance," retrieved on Nov. 8, 2012, 2 pages.
APS-Insight, "Wireless Duress Systems," retrieved on Nov. 8, 2012 from <http://aps-insight.com/wireless-duress-systems>, 3 pages.
TTI Guardian, "Wifi and Duress Messaging Solutions," retrieved on Nov. 8, 2012 from <http://www.ttiguardian.com/wifi-duress-and-messaging.php>, 1 page.
Ando Meritee, ACTi Connecting Vision, "All about Digital Input and Digital Output," Jan. 4, 2010, 28 pages.
OpenIDEO, "How can technology help people working to uphold human rights in the face of unlawful detention?," retrieved on Nov. 8, 2012 from <http://www.openideo.com/open/amnesty/concepting/webcam-hat>, 2 pages.
SPAWAR Systems Center, "Correctional Officer Duress Systems: Selection Guide," Oct. 2003, 82 pages.
"Homer and Apu," From Wikipedia, the free encyclopedia, last modified on Aug. 29, 2015 [retrieved on Sep. 24, 2015]. Retrieved from the Internet: URL<https://en.wikipedia.org/wiki/Homer_and_Apu>, 5 pages.
Representative image from "Homer and Apu", The Simpsons', airing Feb. 10, 1994, 1 page.

* cited by examiner

WEARABLE CAMERA SYSTEMS

CROSS-REFERENCE TO RELATED APPLICATIONS

This application claims priority to U.S. Provisional Application Ser. No. 61/781,506, filed Mar. 14, 2013, the entire contents of which are hereby incorporated by reference.

BACKGROUND

This specification relates to wearable technology.

Designers of computing devices are able to incorporate increasingly more computing power into smaller devices that can be placed on a person's body. Digital cameras are becoming commonplace in various devices, and mobile phones are becoming ubiquitous. Some cameras are designed to be attached to a helmet or another place on a person's body for capturing video clips of events. These cameras typically record and store video clips of an event, and a person can later move the video clips onto a computer.

SUMMARY

This specification describes technologies relating to a hat and a camera system for the hat that can be used for an interactive session with a remote user.

In general, one innovative aspect of the subject matter described in this specification can be embodied in a hat with a camera secured to the hat by a receptacle in the brim. Other embodiments of this aspect include corresponding systems, apparatus, and computer programs, configured to facilitate an interactive assistance session with a user wearing the hat, encoded on computer storage devices. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the actions.

In general, another innovative aspect of the subject matter described in this specification can be embodied in a system comprising: a camera system comprising: a camera; a wireless communications module; a memory storing a plurality of instructions; and a processor configured to execute the instructions stored in the memory and transmit images from the camera using the wireless communications module; a hat comprising: a brim; a receptacle in the brim configured to receive the camera system and secure the camera system to the hat; and at least one battery secured to the hat at a location outside the receptacle in the brim and configured to electrically couple to the camera system.

These and other embodiments can each optionally include one or more of the following features. The camera system is configured to connect, via the wireless communications module and a mobile computing device, to a social networking server, including: authenticating to the social networking server with a user identifier; and sharing one or more images from the digital camera with one or more other user identifiers associated with the user identifier by the social networking server. The system further comprises a microphone and an audio speaker, wherein the camera system is configured to conduct an interactive session with a remote system via the wireless communications module and a mobile device, including: sending audio from the microphone and one or more images from the camera to the remote system; and playing audio from the remote system on the audio speaker. The audio speaker is configured to create audio waves through the hat by bone conduction in the skull of a wearer of the hat. The system further comprises one or more vibration modules configured to receive vibration commands from the remote system to vibrate to indicate to a wearer of the hat that the wearer should turn his head in the direction of the vibration or away from the direction of the vibration.

In general, another innovative aspect of the subject matter described in this specification can be embodied in a method performed for hosting an interactive assistance session, the method comprising: pairing a mobile device with the camera system camera system secured to a hat by a receptacle in the brim of the hat and that is configured to receive the camera system; connecting, by the mobile device, to an interactive session system; selecting, by the mobile device and from the interactive session system, an interactive assistance session, thereby causing the mobile device to transmit a video feed received from the camera system to a remote assistance system and to receive an audio feed from the remote assistance system; and receiving data describing directions for a task with the assistance of a remote user on the remote assistance system viewing the video feed and speaking on the audio feed.

These and other embodiments can each optionally include one or more of the following features. The hat comprises left and right vibration modules and the camera system is configured to activate the left and right vibration modules in response to left and right commands from the interactive session system. The method further comprises attaching a battery module to the hat in a location outside the receptacle in the brim so that the weight of the battery module at least partially balances the weight of the camera system; and electrically coupling the battery module to the camera system. The hat comprises an inductive charging module configured to charge the battery module, the method comprising hanging the hat on an inductive charger to charge the battery after the end of the interactive assistance session. The method further comprises: connecting, by the mobile device, to a social networking server; authenticating to a user account on the social networking server; and selecting one or more user identifiers connected to the user account for sharing, thereby causing the mobile device to transmit the video feed received from the camera system to the social networking server for sharing with one or more user devices associated with the one or more user identifiers.

In general, another innovative aspect of the subject matter described in this specification can be embodied in a wearable camera system comprising: a camera; a wireless communication module; an emergency situation input indicator; a memory storing a plurality of instructions; and a processor configured to execute the instructions stored in the memory and perform operations comprising: determining that the emergency situation input indicator has been activated; determining a geographic location of the wearable camera system; and transmitting, by the wireless communication module, the geographic location of the wearable camera system and a video feed from the camera to an emergency situation server system.

These and other embodiments can each optionally include one or more of the following features. The system comprises a visible session recording indicator, wherein the operations comprise activating the visible session recording indicator in response to determining that the emergency situation input indicator has been activated. The system comprises an audio speaker, wherein the operations comprise receiving an audio feed from the emergency situation server system and playing the audio feed on the audio speaker. Transmitting comprises pairing to a mobile device and transmitting, via the mobile device, the geographic location and the video feed to the emergency situation server system. The system comprises a hat comprising a brim and a receptacle in the brim configured to receive the camera and secure the camera to the hat.

In general, another innovative aspect of the subject matter described in this specification can be embodied in a method performed by an emergency routing system of one or more computers, the method comprising: receiving, from a wearable camera system on a person, an emergency situation indication message and a geographic location of the wearable camera system; determining, from a plurality of emergency handling systems, an emergency handling system based on the geographic location received from the wearable camera system; and routing a video feed from the wearable camera system and the geographic location to the emergency handling system.

These and other embodiments can each optionally include one or more of the following features. The method further comprises routing an audio feed from the emergency handling system to the wearable camera system. The method further comprises automatically sending a notification to a law enforcement or security organization associated with the geographic location. The method further comprises displaying the video feed on a user device to a user associated with a user identifier; storing the video feed; and associating the stored video feed with the user identifier. The method further comprises receiving an audio feed from the wearable camera system and associating the audio feed with the user identifier.

Particular embodiments of the subject matter described in this specification can be implemented so as to realize one or more of the following advantages. A user can engage in a real time interactive assistance session with an expert assistant by a wearable camera system. The user's hands can be kept free using a hat camera system. The expert assistant can provide live feedback to the user, e.g., by an audio feed played to the user, a laser pointer, vibration modules, and so on. The user can activate an emergency situation indicator and cause the wearable camera system to transmit a video feed to an appropriate emergency handling system, potentially deterring a dangerous person near the user. An emergency routing system can route the video feed to an emergency handling system based on a geographic location of the wearable camera system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
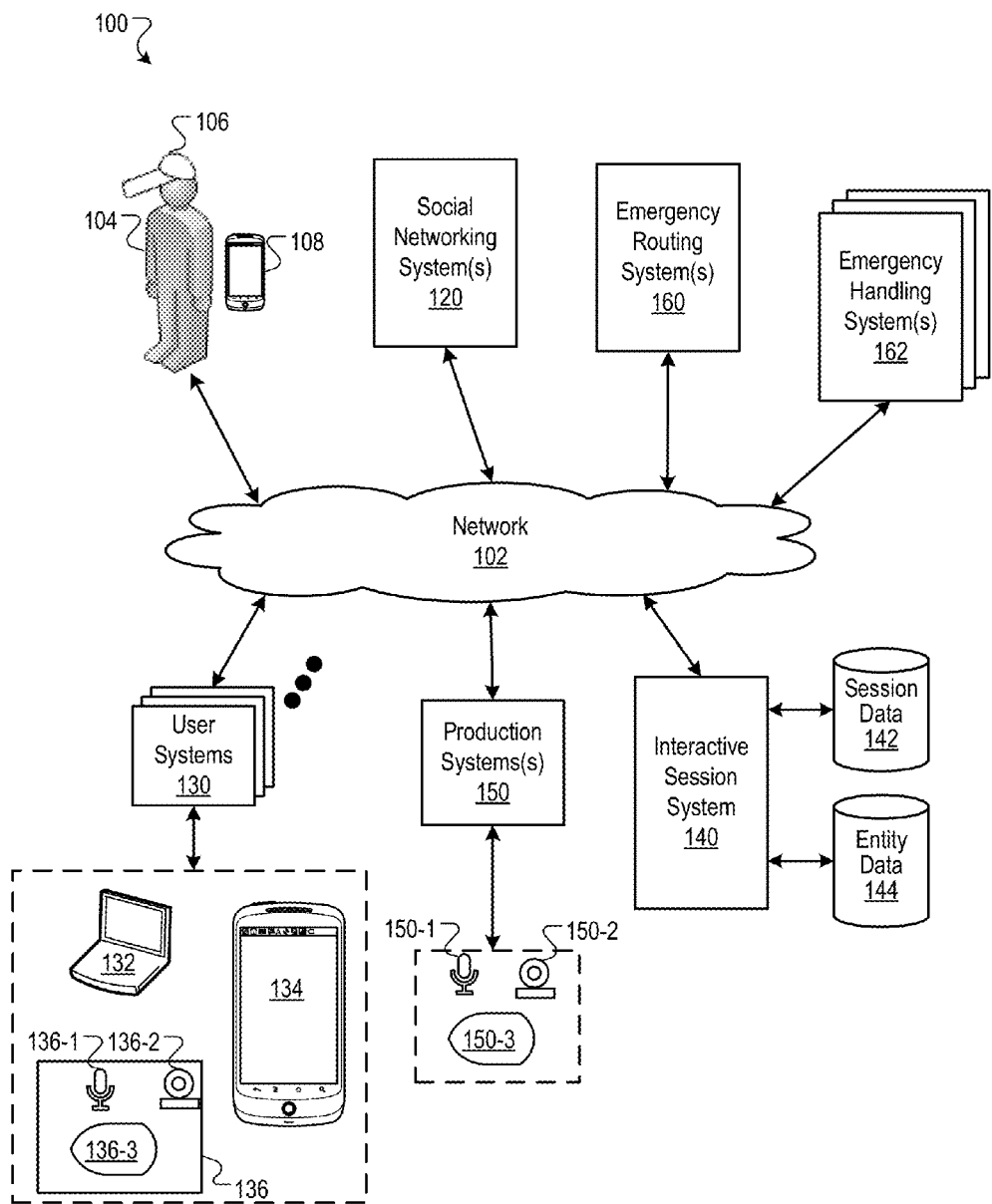
FIG. 1 is a block diagram of an example environment in which a user can send images from a hat camera system over a data communication network.

FIG. 1 is a block diagram of an example environment 100 in which a user 104 can send images from a hat camera system 106 over a data communication network 102. The hat camera system can connect to the network, for example, by pairing with the user's mobile device 108 or by connecting to a Wi-Fi hotspot. The hat camera system 106 includes a camera and can include various optional features, e.g., audio speakers.

The data communication network 102 enables data communication between multiple electronic devices. Users can access content, provide content, exchange information, and participate in interactive sessions by use of the devices and systems that can communicate with each other over the network 102. The network 102 can include, for example, a local area network (LAN), a cellular phone network, a wide area network (WAN), e.g., the Internet, or a combination of them. The links on the network can be wireline or wireless links or both.

A user device 130 receives images and other optional information from the hat camera system and presents them to a different user. A user device 130 is an electronic device, or collection of devices, that is capable of requesting and receiving resources over the network 102. Example user systems 106 include personal computers 132, mobile communication devices 134, and other devices that can send and receive data 136 over the network 102. A user device 130 typically includes a user application, e.g., a web browser, that sends and receives data over the network 102, generally in response to user actions. The web browser can enable a user to display and interact with text, images, videos, music and other information typically located on a web page at a website on the world wide web or a local area network.

A social networking system 120 provides various functions for social networking. The system 120 stores user identifiers and, for each user identifier, user information. The user information can include a profile of the user's background (e.g., interests, activities, career history), pictures, and postings that are shared with other users. The user information includes connections to other user identifiers. The connections can be to other users who are, for example, friends, coworkers, relatives, and business partners. The user information can include grouping information categorizing the connections into categories, e.g., so that certain postings or other information are only shared with users in a certain category.

An interactive session system 140 is also accessible by the user devices 130 and the hat camera system 106 over the network 102. The interactive session system 140 serves interactive sessions and data related to interactive sessions to users. The term "interactive session" is used in this specification to refer to a presentation that allows a user to experience an event or receive data related to the event. Events of different types can be presented. In some implementations, events may be "assistance" events, for which interactive sessions provide step-by-step assistance to users to accomplish a particular task, or events may be "experience" events, for which interactive sessions provide users with an experience of participating in an activity. An example interactive session for an assistance event is a session that describes a step-by-step process to build a computer. An example interactive session for an experience event is a session that provides the experience of driving a certain make and model of an automobile. The interactive session system 140 may also provide interactive sessions for other appropriate event types.

Furthermore, the data that the interactive session system 140 provides for an event may also differ based on the event type and based on the intent of the user. For example, interactive sessions for repair events may provide users with a list of tools and parts required to accomplish a task at the beginning of an interactive session. Likewise, a user may have implicitly or explicitly specified an intent for viewing an interactive session. The user may explicitly specify an intent, for example, by interacting with a user interface element that represents his intent. A user may implicitly specify an intent, for example, by submitting a search query that is related to the intent, or by requesting other information that is related to the intent. For example, a user request for information about purchasing tools needed to repair a computer may be considered an implicit indication of the user's intent to repair a computer.

The interactive session system 140 may also determine specific data to provide based on the intent. For example, a user that is viewing a session that describes building a computer, and with the intent to build the computer, may be presented with additional information, e.g., a list of parts, tools and the time required to complete the task. Another user that is watching the same session with the intent to learn about computers may be presented with other information, e.g., articles about memory, heat dissipation, or other computer-related topics, in a side panel of a viewing environment as the interactive session is presented.

The sessions can be created by expert assistants or non-expert users. The term "expert assistant" is used in this specification to refer to a user or entity that has been accepted by the system 140 for a category, e.g., as a result of the user's or entity's having provided credentials or demonstrated a high level of skill. Examples include a licensed contractor for construction related videos or a company that produces sessions for a particular product the company manufactures and a user that has produced a large number of highly rated sessions.

Production systems 150 can be used to create sessions. Production systems 150 may range from studios to simple hand-held video recording systems. Generally, a production system 150 is a system that includes one or more of an audio input device 150-1, a video input device 150-2, an optional display device 150-3, and optionally other input and output devices and production processes that are used to create sessions. For example, post production processes may be used to add metadata to an interactive session. Such metadata may include, for example, keywords and topical information that can be used to classify the session to one or more topical categories; a list of tools and parts required for a particular session and descriptions of the tools and parts; and so on.

Tactical sensory input devices may also be used in a production system 150. For example, a particular interactive session may provide input data for a "G-suit" that applies pressure to a user's body and that the user interprets as simulated motion. Accordingly, appropriate input systems are used in the production system 150 to generate and store the input data for the interactive session.

Production systems 150 may also be or include devices that are attached to a person. For example, for "point of view" sessions, wearable computer devices that include a camera input device and microphone input device may be worn on a user's person during the time the user is creating the session.

The sessions are stored as sessions data 142 and are associated with authoring entities by entity data 144. A user can use a user device 130 to access the interactive session system 140 to request a session. The interactive session system 140 can provide a user interface to the user devices 130 in which interactive sessions are arranged according to a topical hierarchy. In some implementations, the interactive session system 140 includes a search subsystem that allows users to search for interactive sessions. Alternatively, the search system 110 can search the session data 142 and the entity data 144.

A user experiences a session by use of one or more user devices 130 or the hat camera system 106 or both. Other types of input and output devices may also be used, depending on the type of interactive session. For example, an augmented reality visor that provides a view of a real-world environment augmented by computer-generated graphics may be used. A tactical sensory input device and a tactical sensory output device that applies pressure to a user's body and that the user interprets as simulated motion or other type of feedback may also be used.

Some implementations of an interactive session system 140 provide interactive sessions in real time or near-real time. A real time or near-real time interactive session can be an interactive session that is created in response to a user request for the interactive session. For example, real-time or near-real time sessions may be provided by a company for repairing a product sold by the company when the user cannot find a stored interactive session that fulfills the user's informational needs. Likewise, interactive sessions may be provided as part of a consultation process. For example, an automobile mechanic may contact a user at another location, e.g., the user's home, to consult with the user regarding an automobile repair. The automobile mechanic may then explain to the user, by means of an interactive session that highlights certain parts of the automobile engine as seen from the point of view of the automobile mechanic, certain repairs that are necessary and request authorization from the user to proceed. The user can ask questions and discuss alternatives with the automobile mechanic during the interactive session to make an informed decision.

The hat camera system 106 can facilitate an interactive session for the user 104 in real time. For example, suppose the user 104 is attempting to jump start a car and desires expert assistance. The user 104 puts on the hat camera system 106 and uses the mobile device 108 to look up and connect to an interactive session on the interactive session system 140 for automotive assistance.

Once connected, an expert assistant can see a live image stream from the hat camera system. The expert can speak into a microphone and transmit audio instructions to the user 104, where speakers on the hat camera system 106 or the mobile device 108 play the audio instructions. In this manner, the expert assistant can instruct the user on issues that would be difficult to work on without images, e.g., on a suitable location for a ground clamp, or on whether or not the battery terminals are too corroded for a proper electrical connection.

In some implementations, the expert assistant can provide additional feedback to assist the user. For example, the hat camera system 106 can include vibration modules, e.g., on left and right sides of the hat. The expert can activate the vibration modules to indicate that the user should turn his head left or right, e.g., to look at something different. In another example, the hat camera system 106 can include a remotely directable laser pointer. The expert can move the laser pointer to point at something of interest in the user's field of vision and confirm that the location by viewing the images from the camera.

The hat camera system 106 can also facilitate a sharing session on the social networking system 120. For example, the user can use the mobile device 108 to log in to the social networking system 120, set up a video chat session, and then invite other users to join. The other users can then view live video footage from the hat camera, hear the user speaking through a microphone, send messages to the mobile device, and so on. The mobile device 108 can display one or more video feeds from the other users.

In some implementations, the hat camera system 106 includes an emergency situation button, or switch or other activation device, so that the hat camera system 106 can aid the user in an emergency situation. For example, the emergency situation button can be placed on the top of the hat. The user hits the emergency situation button, e.g., when an attacker or threatening person approaches, or when the user has a health emergency.

The hat camera system responds by sending a video feed to an emergency routing system 106. The emergency routing system can begin recording the feed immediately. The hat camera system can also activate a session recording indicator, e.g., a light emitting diode (LED), that may deter an attacker who knows that the hat camera system is sending the video feed.

In some implementations, the emergency routing system routes the video feed to one of several available emergency handling systems 162. The emergency routing system selects one of the emergency handling systems based on a geographic location of the hat camera system. For example, the hat camera system can determine a location using a Global Positioning System (GPS) module that can be in the hat camera system or the mobile device.

Figure 2A:
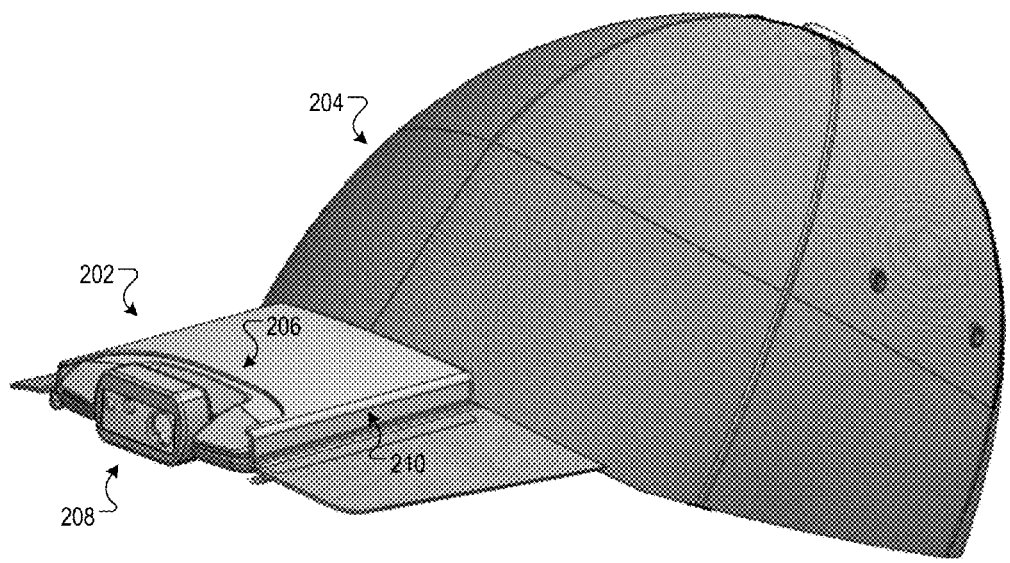
FIGS. 2A-D are views of an example hat camera system.

FIG. 2A is a side view of an example camera system 202 for a hat 204. The camera system includes a body 206 that houses a processor, a memory, and a wireless communications module. The camera system also includes a movable head 208. The hat includes a brim and a receptacle 210 in the brim configured to receive the camera system and secure the camera system to the hat.

In some implementations, the receptacle includes a pair of gripping members extending from the front of the brim to the back of the brim. A user can secure the camera system to the hat by sliding the camera system between the gripping members. In some implementations, the camera system (or the receptacle) includes a latch that clicks into place when the user slides the camera system all the way into place between the gripping members. When the user wants to remove the camera system, the user can release the latch and slide the camera system back out from between the gripping members.

The camera system is configured to connect, via the wireless communications module and a mobile computing device, to a remote computer system. For example, the camera system can pair with the mobile device, e.g., by Bluetooth, and then transmit a video feed from the camera system to the remote computer system. The mobile computing device can be, e.g., a user's mobile phone or tablet. In some implementations, the camera system can be used to make a phone call or video phone call by the user's mobile phone, e.g., by routing audio from the phone to speakers in the hat and audio from a microphone in the hat to the mobile phone.

In some implementations, the user also communicates with the remote computer system using a microphone or an audio speaker or both. For example, the user's mobile device can include an audio speaker and a microphone. In another example, the hat includes a microphone coupled to the camera system and an audio speaker coupled to the camera system. For example, the hat can include an audio speaker configured to create audio waves through the hat by bone conduction in the skull of the user.

The camera system can be configured to connect to an interactive session system or a social networking system or both. For example, the user can, using the user's mobile device, authenticate to a social networking system or an interactive session system. The user can select a group of other users, or a selected expert from the interactive session system, and then begin transmitting a video feed to the selected group or expert.

The user can also transmit an audio feed to the selected group or expert and play audio from the selected group or expert on the audio speaker. In some implementations, one or more users in the group, or the expert, can control the movable head, e.g., by sending one or more commands to the camera system to move the movable head up or down or left or right. In some implementations, one or more users in the group, or the expert, can control a laser pointer on the movable head, e.g., by sending commands to turn the laser pointer on or off.

In some implementations, the camera system includes a USB port or other port. The camera system can be plugged into a computer, e.g., to charge a battery module or to transfer images or both. In some implementations, the camera system is configured to connect to a network without pairing to a mobile device, e.g., by a Wi-Fi access point. In some implementations, the camera system is configured to act as a Wi-Fi access point, e.g., using a network connection from a mobile device paired to the camera system.

Figure 2B:
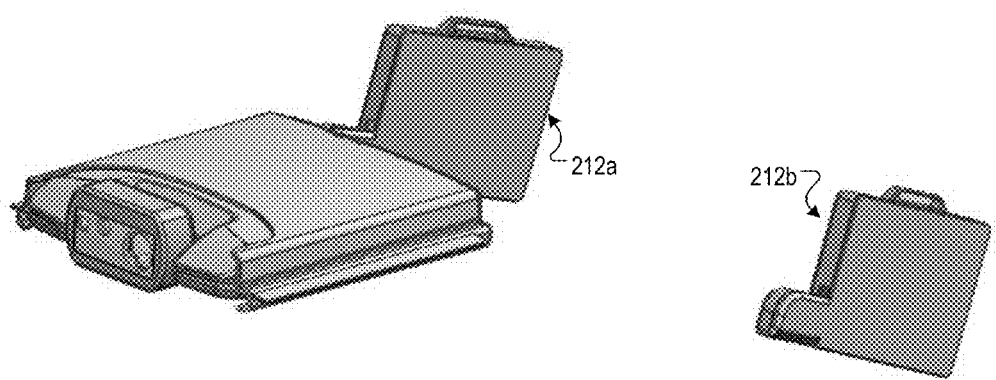

FIG. 2B is a side view of the example camera system and two example battery modules 212a and 212b. One or more of the battery modules can be attached to the hat at locations apart from the camera system. For example, the two battery modules can be attached on the sides of the hat so that the weight of each battery balances the weight of the other battery. In another example, a single battery module can be attached at the back of the hat, e.g., to a strap used to adjust the diameter of the hat, so that the weight of the battery module balances against the weight of the camera system.

The battery modules can be placed on the outside of the hat, the inside of the hat, or into pouches within the fabric of the hat. The battery modules, when attached to the hat, are electrically coupled to the camera system, e.g., by wires or other conductive elements running inside the hat. In some implementations, the hat is configured for inductive charging, e.g., the hat includes an inductive coil system in the periphery of the brim so that a user can hang the hat onto an inductive charging hat hook and begin charging the battery modules. The inductive charging system can be configured so that the batteries do not charge while the user is wearing the hat.

In some implementations, the hat includes solar panels on the outside of the hat that are electrically coupled to the batteries. The solar panels are configured to charge the batteries.

Figure 2C:
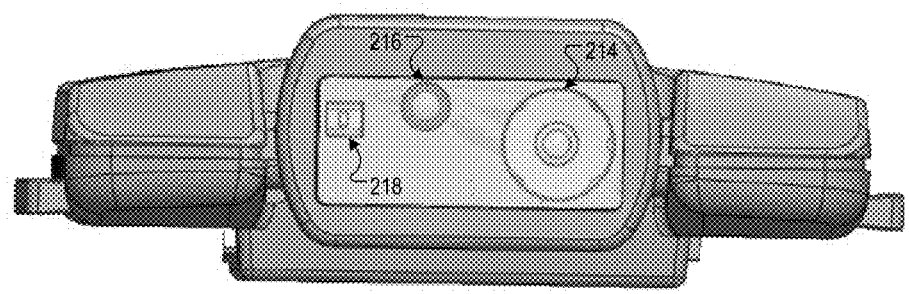

FIG. 2C is a front view of the example camera system. The movable head of the camera system houses a lens 214, a laser pointer 216, and a session recording indicator 218, e.g., a light emitting diode (LED). The lens captures images that the camera system transmits. The laser pointer, in some implementations, can be turned on or off by a remote user, e.g., so that the remote user can direct the local user to something in the local user's field of vision.

Figure 2D:
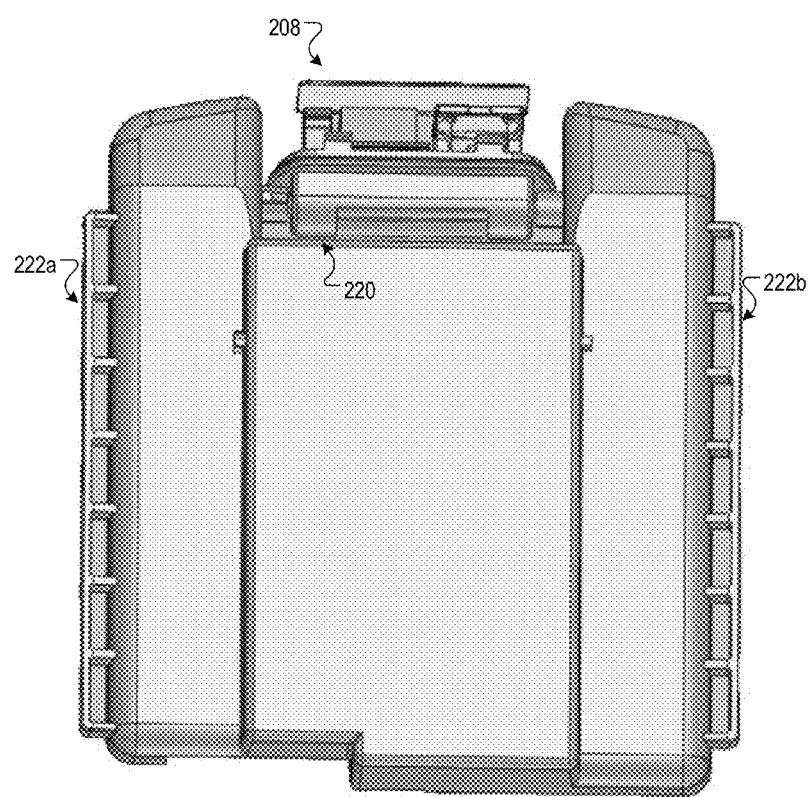

FIG. 2D is a bottom view of the example camera system. The camera system includes an actuator 220 for rotating the movable head. The camera system also includes two grooved rails 222*a-b* configured to mate with the gripping members of the receptacle on the brim of the hat. In some implementations, the camera system includes a power on/off switch on the bottom of the camera system.

Figure 3:
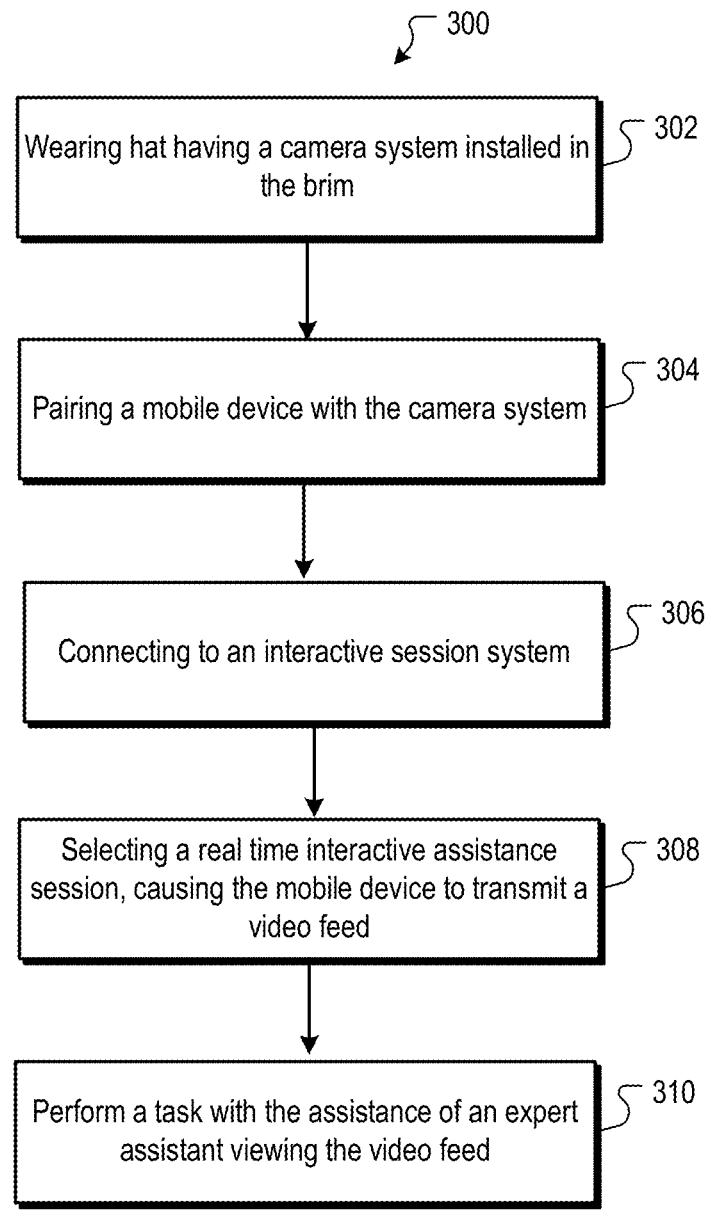
FIG. 3 is a flow diagram of an example method performed by a user for hosting a real time interactive assistance session.

FIG. 3 is a flow diagram of an example method 300 performed by a user for hosting a real time interactive assistance session.

The user places a hat on the user's head (302). The hat includes a camera system secured to the hat by a receptacle in the brim configured to receive the camera system. The camera system can be the example camera system 202 of FIG. 2A.

The user pairs a mobile device with the camera system (304). For example, the user can power on the camera system and place it near the mobile device. The user can then go to a "settings" menu on the mobile device and select a "Bluetooth" or other wireless protocol option and then select "add a new device" from another menu. The mobile device can list available devices, which will include the camera system because the user powered it on and placed it near the mobile device. The user then selects the camera system. In some implementations, the user enters a pairing code for the camera system, which can be printed on a label on the camera system.

The user connects, by the mobile device, to an interactive session system of one or more computers (306). For example, the interactive session system can be the interactive session system 140 of FIG. 1. The user can connect using an interactive session application on the mobile device or a web browser or other software. In some implementations, the user enters a username and password into the mobile device and the mobile device authenticates to a user account on the interactive session system.

The user selects, using the mobile device, a real time interactive assistance session from the interactive session system (308). For example, the user may enter a search query for an interactive assistance session or browse through a variety of interactive assistance sessions, e.g., organized by topical category or expert assistants' names or other criteria. The interactive session system establishes an interactive session between a remote assistance system and the user's mobile device. An expert assistant uses the remote assistance system to communicate with the user.

The mobile device transmits a video feed received from the camera system and an audio feed from the user to the remote assistance system. The audio feed of the user can be captured using a microphone on the mobile device or a microphone on the hat coupled to the camera system. The mobile device receives an audio feed from the expert assistant at the remote assistance system. The mobile device can play the audio feed using a speaker on the mobile device or using one or more speakers on the hat coupled to the camera system by transmitting the audio feed to the camera system. In some implementations, the mobile device receives a video feed from the expert assistant at the remote assistance system and displays the video feed on a display screen of the mobile device.

The user performs a task with the assistance of the expert assistant who is viewing the video feed from the camera system and who are providing instructions to the user via the audio feed (310). In this manner, the expert assistant is viewing essentially what the user is viewing and so can provide precise, appropriate instructions even as the user moves around during completion of the task. Furthermore, since the user is wearing the camera system on the hat, the user has both hands free to work on the task.

In some implementations, the expert assistant can send one or more commands to the user's mobile device or to the camera system. For example, in some implementations, the camera system includes a movable head, e.g., the movable head 208 of FIG. 2A, and the expert assistant can send commands to move the camera system's movable head, e.g., up or down or left or right. In some implementations, the camera system includes a laser pointer, e.g., the laser pointer 216 of FIG. 2C, and the expert assistant can send commands to turn the laser pointer on and off.

In some implementations, the hat includes left and right vibration modules. The camera system is configured to activate the left and right vibration modules in response to left and right commands from the expert assistant. The expert assistant can activate the left vibration module to indicate that the user should turn the user's head to the left and the right vibration module to indicate that the user should turn the user's head to the right, or vice versa.

In some implementations, the hat includes an inductive charging module configured to charge a battery module of the hat. After the real time interactive assistance session is over, the user can hang the hat on an inductive charger to charge the battery. The inductive charging module can be configured so that the hat does not charge while the user is wearing the hat.

Figure 4:
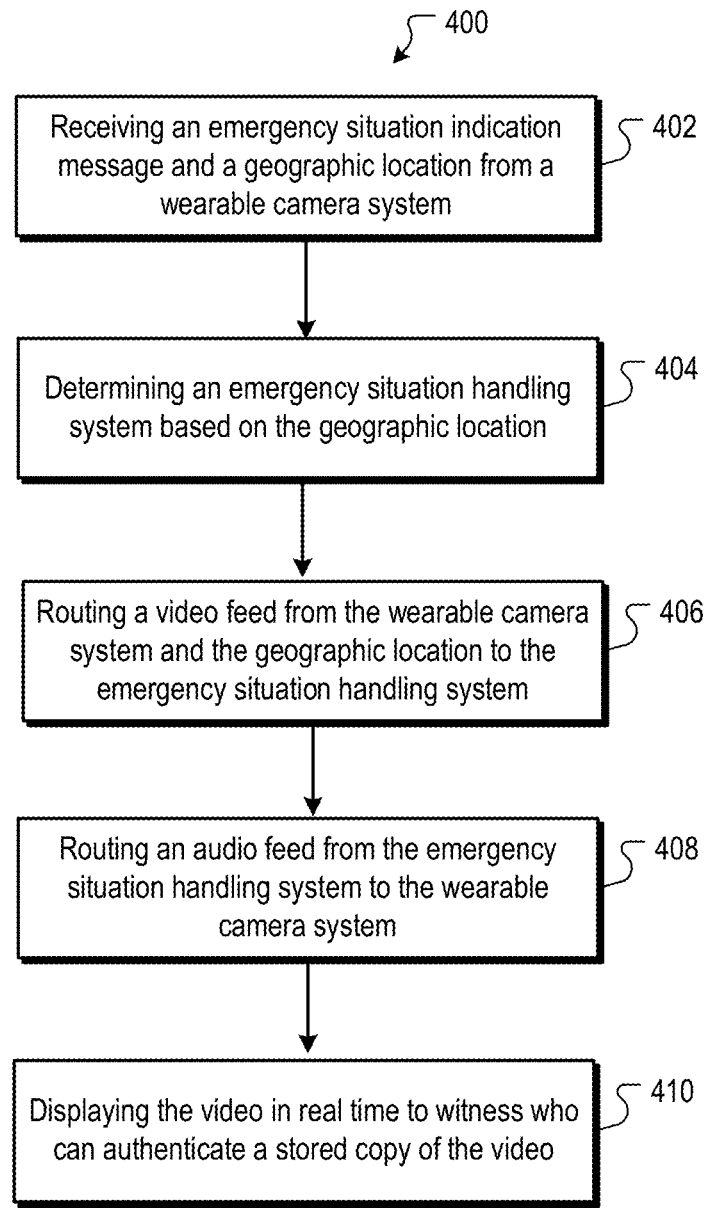
FIG. 4 is a flow diagram of an example method performed by an emergency routing system for handling an emergency situation.

FIG. 4 is a flow diagram of an example method 400 performed by an emergency routing system for handling an emergency situation. The emergency routing system is a system of one or more computers.

The emergency routing system receives, from a wearable camera system on a person, an emergency situation indication message (402). The wearable camera system can be, for example, the hat camera system 106 of FIG. 1. The emergency routing system also receives a geographic location of the wearable camera system. For example, the wearable camera system can include a Global Positioning System (GPS) unit that determines the geographic location, or the wearable camera system can triangulate the location from cell towers or Wi-Fi networks.

The emergency routing system determines, from at least two available emergency handling systems, an emergency handling system to handle the emergency situation based on the geographic location received from the wearable camera system (404). Each emergency handling system is a system of one or more computers. The emergency routing system can determine the emergency handling system using a mapping between locations and emergency handling systems. The mapping can be populated, for example, by a system operator.

For example, if the geographic location is inside of a mall, the emergency routing system can select an emergency handling system for mall security. In another example, if the user is on a boat, the emergency routing system can select an emergency handling system for the Coast Guard. In another example, if the user is on a highway, the system can select an emergency handling system for a highway patrol.

The emergency routing system routes a video feed from a camera of the wearable camera system and the geographic location to the emergency handling system (406). In some implementation, the wearable camera system sends the video feed to the emergency routing system which then forwards the feed to the emergency handling system; in some other implementations, the wearable camera system sends the video feed to the emergency handling system and not the emergency routing system. The system can optionally automatically send a notification to a law enforcement or security organization associated with the geographic location.

In some implementations, the emergency routing system, or the emergency handling system, routes an audio feed from the emergency handling system to the wearable camera system (408). The wearable camera system can include an audio speaker that plays the audio feed. In this manner, a person using the emergency handling system can provide instructions to the wearer of the wearable camera system, or can make it known to an attacker or threatening person that the emergency is being captured, live, by the video feed in an effort to deter a crime or other situation.

In some implementations, the emergency routing system, or the emergency handling system, displays the video feed in real time on a user device to a user associated with a user identifier (410). The system stores the video feed and associates the stored video feed with the user identifier. The user can then later authenticate the video and testify, if needed, that the user viewed the video live at the time of the emergency. In some implementations, the system receives an audio feed from the wearable camera system and stores the audio feed and associates the audio feed with the user identifier.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non-volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this specification can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
    a camera system comprising:
        a camera;
        a wireless communications module;
        a memory storing a plurality of instructions; and
        a processor configured to execute the instructions stored in the memory and transmit images from the camera using the wireless communications module;
    a hat comprising:
        a brim;
        an orientation-specific receptacle embedded in the brim configured to receive the camera system in the brim and to detachably secure the camera system to the brim of the hat, such that a first portion of the camera system protrudes above a surface of the brim and a second portion of the camera system protrudes below the surface of the brim;
        at least one battery secured to the hat at a location outside the receptacle in the brim and configured to electrically couple to the camera system;
        a first vibration module located on a first side of the hat and that vibrates in response to a first command received from a remote system and initiated by a user of the remote system to indicate to a wearer of the hat that the wearer should turn the wearer's head in a direction of the first side; and
        a second vibration module located on a second side of the hat opposite the first side of the hat and that vibrates in response to a second command received from the remote system and initiated by the user of the remote system to indicate to the wearer of the hat that the wearer should turn the wearer's head in a direction of the second side.

2. The system of claim 1, wherein the camera system is configured to connect, via the wireless communications module and a mobile computing device, to a social networking server, including:
    authenticating to the social networking server with a user identifier; and
    sharing one or more images from the digital camera with one or more other user identifiers associated with the user identifier by the social networking server.

3. The system of claim 1, further comprising a microphone and an audio speaker, wherein the camera system is configured to conduct an interactive session with the remote system via the wireless communications module and a mobile device, including:
    sending audio from the microphone and one or more images from the camera to the remote system; and
    playing audio from the remote system on the audio speaker.

4. The system of claim 3, wherein the audio speaker is configured to create audio waves through the hat by bone conduction in the skull of the wearer of the hat.

5. The system of claim 1, wherein the camera system is received in the brim through a front side of the brim.

6. The system of claim 1, wherein the camera system is received in the brim with the first portion of the camera system protruding through a void in a surface of the brim to a position above the brim and the second portion of the camera system protrudes through the void in the brim to a position below the brim.

7. The system of claim 1, wherein the camera system is received in a receptacle of the brim that includes opposing gripping members that extend from a front of the brim to a back of the brim.

8. A method performed for hosting an interactive assistance session, the method comprising:
    pairing a mobile device with a camera system that is detachably secured to an orientation-specific receptacle embedded in a brim of a hat, wherein:
        the orientation-specific receptacle is configured to receive the camera system in the brim, such that a first portion of the camera system protrudes above a surface of the brim and a second portion of the camera system protrudes below the surface of the brim; and
        the hat comprises:
            a first vibration module located on a first side of the hat and that vibrates in response to a first command received from the mobile device and initiated by a remote user of a remote assistance system to indicate to a wearer of the hat that the wearer should turn the wearer's head in a direction of the first side; and
            a second vibration module located on a second side of the hat opposite the first side of the hat and that vibrates in response to a second command received from the mobile device and initiated by the remote user of the remote assistance system to indicate to the wearer of the hat that the wearer should turn the wearer's head in a direction of the second side;
    connecting, by the mobile device, to an interactive session system;
    selecting, by the mobile device and from the interactive session system, an interactive assistance session, thereby causing the mobile device to transmit a video feed received from the camera system to the remote assistance system and to receive an audio feed from the remote assistance system;

receiving data describing directions for a task with the assistance of the remote user on the remote assistance system viewing the video feed and speaking on the audio feed; and providing, by the mobile device, the first command to the first vibration module in response to data received from the remote assistance system.

9. The method of claim 8, further comprising:

attaching a battery module to the hat in a location outside the receptacle in the brim so that the weight of the battery module at least partially balances the weight of the camera system; and electrically coupling the battery module to the camera system.

10. The method of claim 9, wherein the hat comprises an inductive charging module configured to charge the battery module, the method comprising hanging the hat on an inductive charger to charge the battery after the end of the interactive assistance session.

11. The method of claim 8, further comprising:

connecting, by the mobile device, to a social networking server;

authenticating to a user account on the social networking server; and selecting one or more user identifiers connected to the user account for sharing, thereby causing the mobile device to transmit the video feed received from the camera system to the social networking server for sharing with one or more user devices associated with the one or more user identifiers.

12. The method of claim 8, wherein the camera system is received in the brim through a front side of the brim.

13. A wearable camera system comprising:

a camera;
a wireless communication module;
an emergency situation input indicator;
a memory storing a plurality of instructions;
a processor;
a body housing the camera, the wireless communication module, the emergency situation input indicator, the memory, and the processor; and
a hat comprising:
a brim and an orientation-specific receptacle embedded in the brim that is configured to receive the body housing the camera, the wireless communication module, the emergency situation input indicator, the memory, and the processor, and to detachably secure the body housing the camera, the wireless communication module, the emergency situation input indicator, the memory, and the processor to the brim of the hat such that a first portion of the body protrudes above a surface of the brim and a second portion of the body protrudes below the surface of the brim;
a first vibration module located on a first side of the hat and that vibrates in response to a first command received from a remote system and initiated by a user of the remote system to indicate to a wearer of the hat that the wearer should turn the wearer's head in a direction of the first side; and
a second vibration module located on a second side of the hat opposite the first side of the hat and that vibrates in response to a second command received from the remote system and initiated by the user of the remote system to indicate to the wearer of the hat that the wearer should turn the wearer's head in a direction of the second side;
wherein the processor is configured to execute the instructions stored in the memory and perform operations comprising:
determining that the emergency situation input indicator has been activated;
determining a geographic location of the wearable camera system; and
transmitting, by the wireless communication module, the geographic location of the wearable camera system and a video feed from the camera to an emergency situation server system.

14. The wearable camera system of claim 13, comprising a visible session recording indicator, wherein the operations comprise activating the visible session recording indicator in response to determining that the emergency situation input indicator has been activated.

15. The wearable camera system of claim 13, comprising an audio speaker, wherein the operations comprise receiving an audio feed from the emergency situation server system and playing the audio feed on the audio speaker.

16. The wearable camera system of claim 13, wherein transmitting comprises pairing to a mobile device and transmitting, via the mobile device, the geographic location and the video feed to the emergency situation server system.

17. The wearable camera system of claim 13, wherein the body housing the camera is received through a front side of the brim.

* * * * *